United States Patent

[11] 3,540,782

| [72] | Inventor | Hans Worm |
| | | 42 Schaberg D-565, Solingen, Germany |
| [21] | Appl. No. | 793,000 |
| [22] | Filed | Jan. 22, 1969 |
| [45] | Patented | Nov. 17, 1970 |
| [32] | Priority | Nov. 4, 1968 |
| [33] | | Switzerland |
| [31] | | No. 16,400/68 |

[54] BALL BEARING
8 Claims, 9 Drawing Figs.

| [52] | U.S. Cl. | 308/6 |
| [51] | Int. Cl. | F16c 19/10 |
| [50] | Field of Search | 308/6c, 6; 64/27 |

[56] References Cited
UNITED STATES PATENTS
3,304,745  2/1967  King et al. .................... 64/23

*Primary Examiner*—Fred C. Mattern, Jr.
*Assistant Examiner*—Frank Susko
*Attorney*—Sughrue, Rothwell, Mion, Zinn and MacPeak ABSTRACT: Ball bearing has outer tube surrounding a shell having two races which together with two races in the shaft form two separate endless paths for the balls. Two spring-steel plates with races press the balls along the shaft races to eliminate all play therealong.

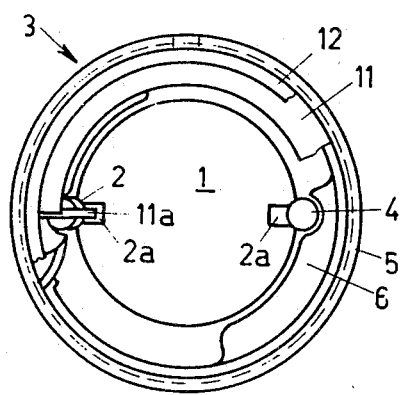
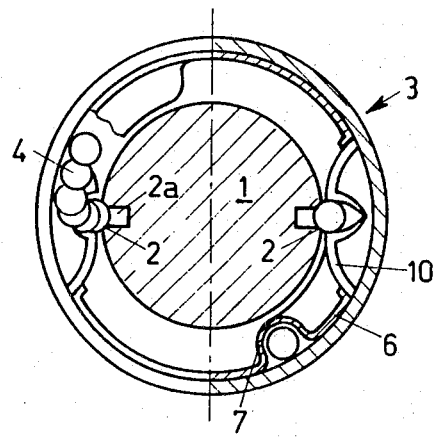
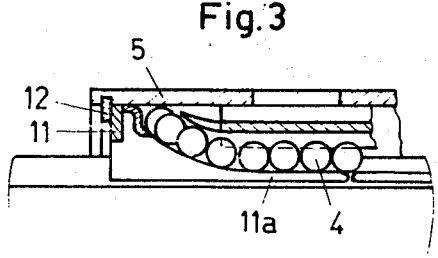
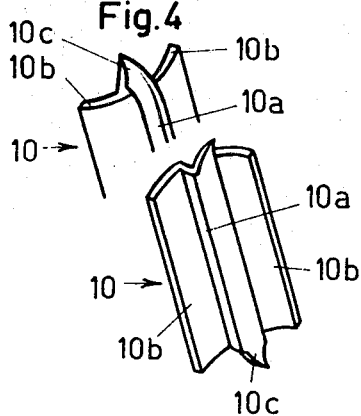
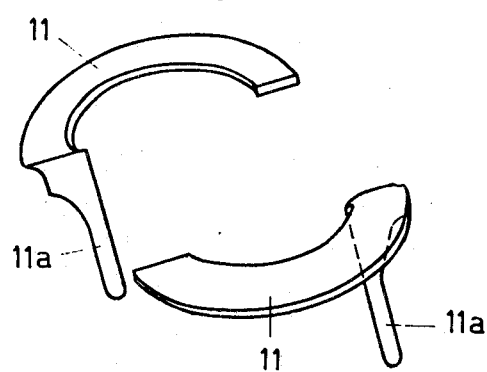

BALL BEARING

BACKGROUND OF THE INVENTION

The invention relates to a ball bearing free to move longitudinally along a shaft, and includes a race housing round in cross section, at least two races in the race housing spaced circumferentially therearound and each including a longitudinal path, a plurality of balls in each of these races, a longitudinal race in the shaft for each of the aforesaid races, each shaft race being connected to a corresponding housing race to form a complete and endless, approximately oval-shaped path around which the balls are free to move, the balls being under load along the shaft races and engaging the latter, and not under load along the housing races.

Ball bearings of this type are described in the prior art. They enable a virtually frictionless and highly wear-resistant mounting of machine parts on shafts. The use of ball races incorporated in the shaft and in the race housing permits a torque to be transmitted between the shaft and the housing. While assembling the bearing housing on the shaft, it is very important, after the balls have been inserted, to obtain as precise a fit as possible between the shaft and the housing races, if the load capacity and the movement of the ball bearing are to be satisfactory. With hardened shafts, however, close tolerances require expensive machining. It has been suggested that this disadvantage can be avoided by slotting the outer sleeve of the bearing housing, thereby making the latter adjustable; but such adjustable housings are not round in cross section and in operation are not perfectly coaxial with respect to the shaft.

SUMMARY OF THE INVENTION

The purpose of the invention is to produce a ball bearing having a race housing that automatically and continuously adjusts itself without play, and which can be manufactured appreciably cheaper and more simply without machining.

BRIEF DESCRIPTION OF THE DRAWINGS

The invention will be described, with reference to the FIGS. of the drawings, wherein:

FIG. 1 is an end on view of a shaft provided with the ball bearing of the invention, some parts of the ball bearing being removed;

FIG. 2 is a transverse view through the ball bearing, the left half of the FIG. being partly cut away, and the right half showing the two ball races of the rolling path;

FIG. 3 is a longitudinal section showing one-half of the bearing housing;

FIG. 4 is a perspective view of the two guide plates;

FIG. 5 is a perspective view of the two end members for one end of the bearing housing;

DESCRIPTION OF THE PREFERRED EMBODIMENTS

Figure 6:
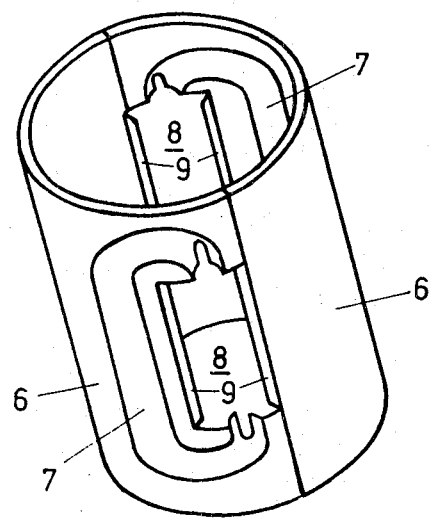
FIG. 6 is a perspective view of the two shells incorporating stamped-out ball races.
Figure 7:
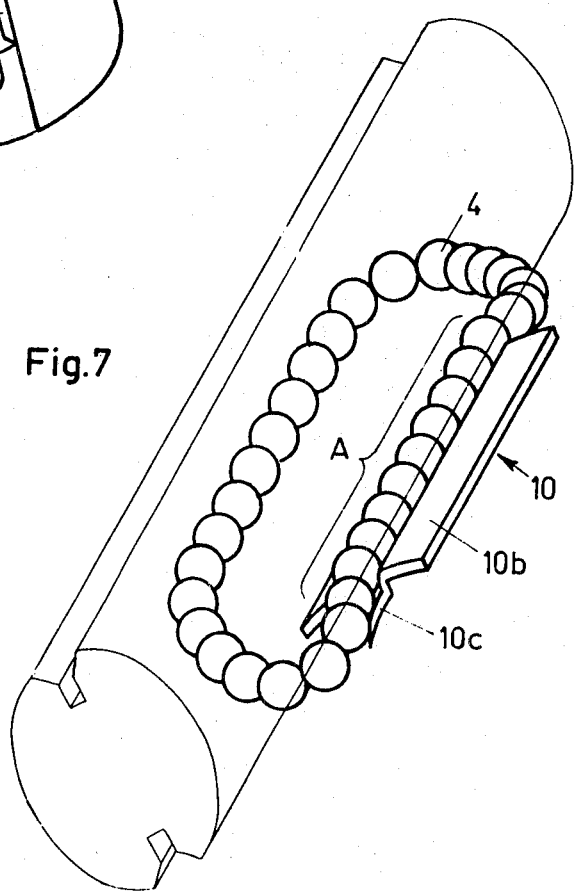
FIG. 7 is a perspective view of one complete ball path.
Figure 8:
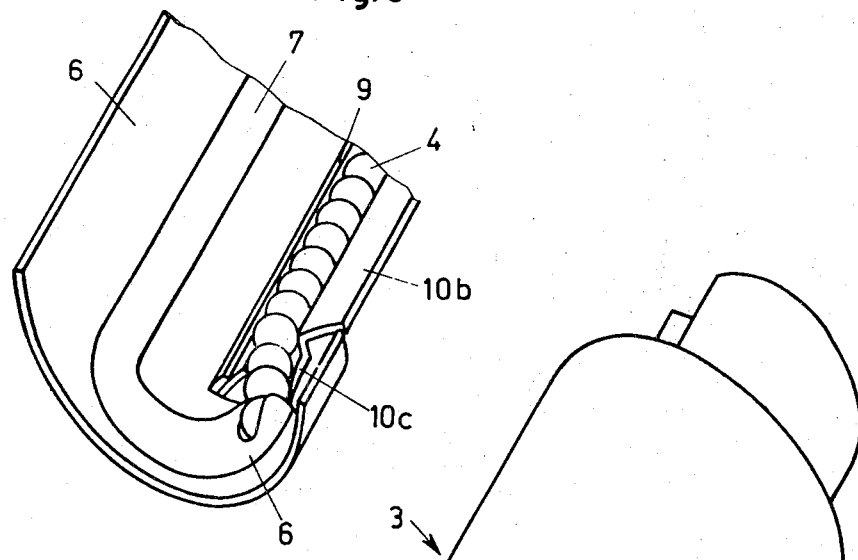
FIG. 8 is a perspective view of a guide plate fitted in one of the semicircular shells.
Figure 9:
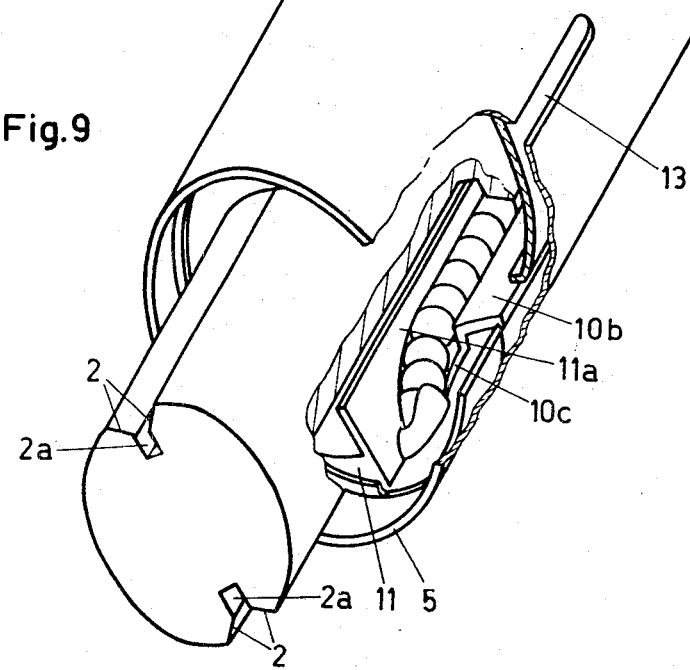
FIG. 9 is a perspective view, partly cutaway, of a completely assembled ball bearing mounted on a shaft.

A ball-bearing housing 3, supported by ball bearings 4 held in an endless, approximately oval-shaped race, is arranged on a shaft 1 incorporating two diametrically opposite races 2. The housing 3 comprises an outer tube 5 in which two semicircular shells 6 are inserted, and held in place by any suitable expedient, such as spot welding. The shells 6, which are stamped out of sheet metal, are shown separately in their fitted position in FIG. 6. Each shell embodies stamped into it a race 7 comprising a connecting and a return path for the ball bearings 4 moving from the rolling race-path A, shown in FIG. 7. Each shell thus constitutes a housing for a race, the two shells together comprising a complete race housing for the ball bearing. Each shell further embodies an elongated window 8, of which each lengthwise edge has an inwardly projecting lug 9. A guide plate 10, shown separately in FIG. 4, is mounted in each window by wedging it between the lugs thereof. These two guide plates serve to guide the ball bearings 4 along the rolling path A, along which the balls run in the race 2 of the shaft 1. The guide plates 10 are stamped out of spring steel and incorporate along their middle a hardened ball-bearing race 10a, from each side of which projects a springy wing 10b that presses against the outer tube 5 and is held tensed by the lugs 9. The guide plates thus resiliently press the balls 4 into the shaft races 2, preventing any play along the rolling path A. A guide nose 10c for the balls 4 is embodied at each end of the race 10a of a guide plate 10. The balls 4 are under load in the path A, but not under load in the race 7.

At each end of the housing 3 are arranged two end members 11, each in the shape of a semiannulus that is pressed against one end of a respective shell and held in place by a snap ring 12. Each member 11 incorporates a nose 11a that projects at right angles from the member and partway into the groove 2a of the race 2. These noses serve to guide the ball bearings 4 from the races 2 and 10a of the rolling path A into the connecting and return paths of the race 7, or from the latter paths into the former path, depending on which direction the housing 3 moves along the shaft 1. In order to prevent the ball bearings from falling out of the housing 3 when the shaft 1 is removed, the noses 11a are advantageously made sufficiently long so that they reach to the middle of the rolling paths A. As can be seen in FIG. 3, these noses cooperate with those 10c of the guide plates 10.

The balls in the rolling path A, which is under load and consists of the races 2 and 10a, are guided free of play at all times, owing to the springiness of the guide plate 10, whereas the ball bearings in the race 7 of a shell 6 have a certain amount of play to facilitate their movement back to the rolling path A.

In accordance with the invention, the outer tube 5 of the housing 3 can incorporate a keyway 13, so that a key can transmit a torque to a machine part surrounding the housing 3; or the tube 5 can be provided with a surface for mounting a table guide.

Further in accordance with the invention, the housing 3 can embody four or six, or any other suitable number, of ball-bearing races, instead of the two described. The guide plates 10 can be eliminated, and the races 10a, with resilient side wings 10b, stamped into the outer tube 5.

Although the preferred embodiments of the invention have been described, the scope of, and the breadth of protection afforded to, the invention is limited solely by the appended claims.

I claim:

1. A ball bearing free to move longitudinally along a shaft, including a race housing 6 round in cross section, at least two races 7 in said housing spaced around the circumference thereof and each including a longitudinal path, a plurality of balls 4 in each said race, a longitudinal race 2 in the shaft for each said housing race, each said shaft race connected to a corresponding housing race to form a complete and endless, approximately oval-shaped path around which said balls are free to move, said balls being under load along said shaft races and engaging the latter, and not under load along said housing races, and wherein the improvement comprises a further race 10a for each said shaft race, stamped out of hardened metal, for resiliently pressing said balls into a respective one of said shaft races to eliminate all play at all times along said shaft races, and a tensed, springy lateral projection 10b, stamped out of spring metal, embodied on each side of each said further race for resiliently pressing a respective said further race against said balls in a respective said shaft race.

2. The ball bearing as defined in claim 1, including an outer tube 5 surrounding said housing for supporting said projections.

3. The ball bearing as defined in claim 2, including a pair of spaced stops 9 incorporated in said housing for each said further race and between which said two projections thereof are wedged.

4. The ball bearing as defined in claim 1, including an outer tube 5 surrounding said housing, and wherein said further races and lateral projections thereof are integral with, and stamped out of, said outer tube.

5. The ball bearing as defined in claim 1, including a longitudinal groove 2a embodied by each said shaft race, at least one member 11 at each end of said oval-shaped ball paths, and an individual ball guide 11a for each said shaft groove connected to each said member and projecting into the respective said shaft groove for guiding said balls between a said shaft race and the corresponding said housing race.

6. The ball bearing as defined in claim 5, wherein there are at least two said members at each end of said oval-shaped ball paths, each said member forming part of an annulus, and all of the members common to one end defining a complete annulus.

7. The ball bearing as defined in claim 5, including a ball-guide nose 10c incorporated at each end of each said further race for cooperating with a respective one of said ball guides.

8. The ball bearing as defined in claim 7, wherein said grooves extend along the bottom and the entire length of said shaft races, and each said ball guide extends to below the middle of the corresponding shaft race for holding said balls in said further races when the shaft is removed.